US008184183B2

(12) United States Patent
Shima

(10) Patent No.: US 8,184,183 B2
(45) Date of Patent: May 22, 2012

(54) IMAGE PROCESSING APPARATUS, IMAGE PROCESSING METHOD AND PROGRAM WITH DIRECTION-DEPENDENT SMOOTHING BASED ON DETERMINED EDGE DIRECTIONS

(75) Inventor: Nobuyuki Shima, Hachioji (JP)

(73) Assignee: Olympus Corporation, Tokyo (JP)

( * ) Notice: Subject to any disclaimer, the term of this patent is extended or adjusted under 35 U.S.C. 154(b) by 186 days.

(21) Appl. No.: 12/702,758

(22) Filed: Feb. 9, 2010

(65) Prior Publication Data

US 2010/0134661 A1 Jun. 3, 2010

Related U.S. Application Data

(63) Continuation of application No. PCT/JP2008/062106, filed on Jul. 3, 2008.

(30) Foreign Application Priority Data

Aug. 10, 2007 (JP) ................................. 2007-210187

(51) Int. Cl.
*H04N 5/217* (2011.01)
*H04N 5/208* (2006.01)
*G06K 9/40* (2006.01)

(52) U.S. Cl. ......................... 348/252; 348/241; 382/266

(58) Field of Classification Search ............... 348/222.1, 348/234, 241, 242, 252, 253; 382/266–269
See application file for complete search history.

(56) References Cited

U.S. PATENT DOCUMENTS

| 5,382,976 A | 1/1995 | Hibbard |
| 6,563,537 B1 | 5/2003 | Kawamura et al. |
| 7,016,549 B1 | 3/2006 | Utagawa |
| 7,391,903 B2 | 6/2008 | Ishiga |
| 8,018,501 B2 * | 9/2011 | Sasaki ........................ 348/223.1 |
| 2009/0115870 A1 * | 5/2009 | Sasaki ........................ 348/223.1 |
| 2010/0086202 A1 * | 4/2010 | Omata et al. .................. 382/162 |
| 2011/0069192 A1 * | 3/2011 | Sasaki ........................ 348/222.1 |

FOREIGN PATENT DOCUMENTS

| JP | 7-59098 A | 3/1995 |
| JP | 11-103466 A | 4/1999 |
| JP | 2001-061157 A | 3/2001 |
| WO | WO 2004/112401 A1 | 12/2004 |

OTHER PUBLICATIONS

International Preliminary Report on Patentability (in English) dated Feb. 24, 2010 in parent International Application No. PCT/JP2008062106.
English Language International Search Report dated Oct. 21, 2008 issued in parent Appln. No. PCT/JP2008/062106.

* cited by examiner

*Primary Examiner* — Daniel M Pasiewicz
(74) *Attorney, Agent, or Firm* — Holtz, Holtz, Goodman & Chick, PC

(57) ABSTRACT

An image processing apparatus is configured as follows. Namely, an image processing apparatus is provided with an imaging device in which a plurality of types of imaging elements having different spectral sensitivities are aligned on a single plane and which obtains a color imaging signal, first edge direction judging unit which judges a direction along which an edge is produced in the color imaging signal based on pixel values of the respective imaging elements, a high-color difference region judging unit which judges a region where the pixel values have a high-color difference, second edge direction judging unit which further judges a direction of the edge, direction dependence smoothing unit which smoothes the pixel values of the respective imaging elements by interpolating them along the direction, and omnidirectional smoothing unit which smoothes the pixel values of the respective imaging elements in all directions based on pixel values of peripheral pixels.

6 Claims, 17 Drawing Sheets

| f00 | f0 | f02 | f0 | f0 | f05 | f06 | f07 |
|---|---|---|---|---|---|---|---|
| f10 | f1 | f12 | f1 | f1 | f15 | f16 | f17 |
| f20 | f2 | f22 | f2 | f2 | f25 | f26 | f27 |
| f30 | f3 | f32 | f3 | f3 | f35 | f36 | f37 |
| f40 | f4 | f42 | f4 | f4 | f45 | f46 | f47 |
| f50 | f5 | f52 | f5 | f5 | f55 | f56 | f57 |
| f60 | f6 | f62 | f6 | f6 | f65 | f66 | f67 |
| f70 | f7 | f72 | f7 | f7 | f75 | f76 | f77 |

F I G. 10A

| f00 | 0 | f02 | 0 | f0 | 0 | f06 | 0 |
|---|---|---|---|---|---|---|---|
| 0 | 0 | 0 | 0 | 0 | 0 | 0 | 0 |
| f20 | 0 | f22 | 0 | f2 | 0 | f26 | 0 |
| 0 | 0 | 0 | 0 | 0 | 0 | 0 | 0 |
| f40 | 0 | f42 | 0 | f4 | 0 | f46 | 0 |
| 0 | 0 | 0 | 0 | 0 | 0 | 0 | 0 |
| f60 | 0 | f62 | 0 | f6 | 0 | f66 | 0 |
| 0 | 0 | 0 | 0 | 0 | 0 | 0 | 0 |

F I G. 10B

| 0 | f0 | 0 | f0 | 0 | f05 | 0 | f07 |
|---|---|---|---|---|---|---|---|
| 0 | 0 | 0 | 0 | 0 | 0 | 0 | 0 |
| 0 | f2 | 0 | f2 | 0 | f25 | 0 | f27 |
| 0 | 0 | 0 | 0 | 0 | 0 | 0 | 0 |
| 0 | f4 | 0 | f4 | 0 | f45 | 0 | f47 |
| 0 | 0 | 0 | 0 | 0 | 0 | 0 | 0 |
| 0 | f6 | 0 | f6 | 0 | f65 | 0 | f67 |
| 0 | 0 | 0 | 0 | 0 | 0 | 0 | 0 |

FIG. 10C

| 0 | 0 | 0 | 0 | 0 | 0 | 0 | 0 |
|---|---|---|---|---|---|---|---|
| f10 | 0 | f12 | 0 | f1 | 0 | f16 | 0 |
| 0 | 0 | 0 | 0 | 0 | 0 | 0 | 0 |
| f30 | 0 | f32 | 0 | f3 | 0 | f36 | 0 |
| 0 | 0 | 0 | 0 | 0 | 0 | 0 | 0 |
| f50 | 0 | f52 | 0 | f5 | 0 | f56 | 0 |
| 0 | 0 | 0 | 0 | 0 | 0 | 0 | 0 |
| f70 | 0 | f72 | 0 | f7 | 0 | f76 | 0 |

FIG. 10D

| 0 | 0 | 0 | 0 | 0 | 0 | 0 | 0 |
|---|---|---|---|---|---|---|---|
| 0 | $f_1$ | 0 | $f_1$ | 0 | $f_{15}$ | 0 | $f_{17}$ |
| 0 | 0 | 0 | 0 | 0 | 0 | 0 | 0 |
| 0 | $f_3$ | 0 | $f_3$ | 0 | $f_{35}$ | 0 | $f_{37}$ |
| 0 | 0 | 0 | 0 | 0 | 0 | 0 | 0 |
| 0 | $f_5$ | 0 | $f_5$ | 0 | $f_{55}$ | 0 | $f_{57}$ |
| 0 | 0 | 0 | 0 | 0 | 0 | 0 | 0 |
| 0 | $f_v$ | 0 | $f_7$ | 0 | $f_{75}$ | 0 | $f_{77}$ |

F I G. 10E

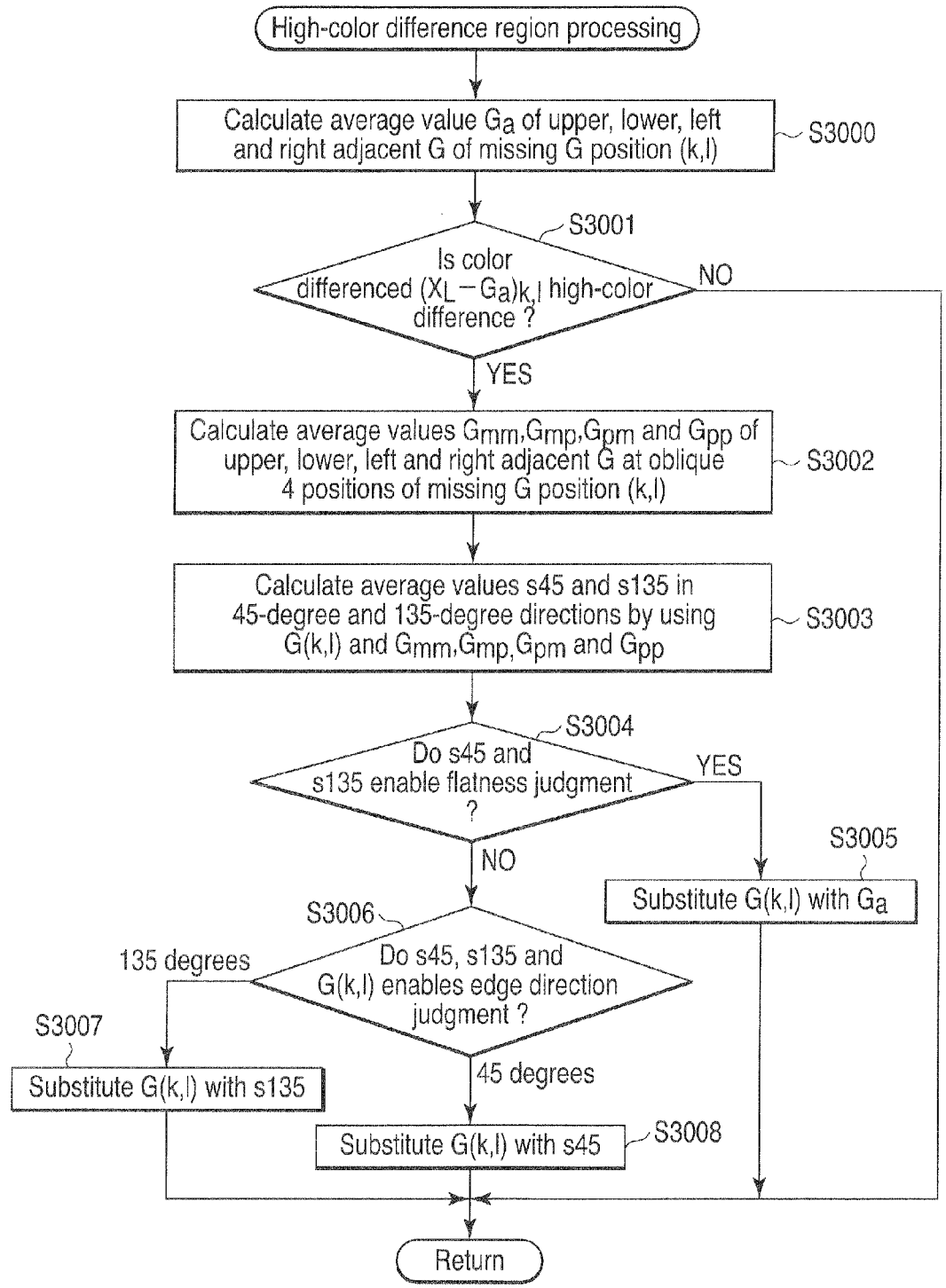
F I G. 12

IMAGE PROCESSING APPARATUS, IMAGE PROCESSING METHOD AND PROGRAM WITH DIRECTION-DEPENDENT SMOOTHING BASED ON DETERMINED EDGE DIRECTIONS

CROSS REFERENCE TO RELATED APPLICATIONS

This is a Continuation Application of PCT Application No. PCT/JP2008/062106, filed Jul. 3, 2008, which was published under PCT Article 21(2) in Japanese.

This application is based upon and claims the benefit of priority from prior Japanese Patent Application No. 2007-210187, filed Aug. 10, 2007, the entire contents of which are incorporated herein by reference.

BACKGROUND OF THE INVENTION

1. Field of the Invention

The present invention relates to an image processing apparatus, an image processing method and a program that process a color imaging signal obtained by an imaging device in which a plurality of types of imaging elements having different spectral sensitivities are regularly aligned on a single plane.

2. Description of the Related Art

An apparatus that electrically acquires a color image can be roughly divided into an apparatus having a three-chip imaging element configuration that can simultaneously obtain three color (R, G, B) signals at one pixel position and an apparatus having a single-chip imaging element configuration that can obtain one color signal alone in three color signals at each pixel position. Currently commercially available digital cameras generally have the single-chip imaging element configuration.

Although the three-chip imaging element configuration is expensive since its configuration is complicated and the number of its components is large, it can simultaneously obtain three color signals at each pixel position of an acquired image, and hence it generally has a high image quality.

On the other hand, the single-chip imaging element configuration is a simple configuration, but R, G and B filters must be arranged in, e.g., a mosaic pattern which is called a Bayer arrangement shown in FIG. 14 in accordance with each pixel in order to obtain three color pixels.

In such a Bayer arrangement, the three color signals are obtained at each pixel by interpolating missing color signals at respective pixel positions with color signals at peripheral pixel positions.

The easiest method for reducing such a false color is forming on an imaging element an image having characteristics of a lens or an optical low-pass filter reduced to a spatial frequency that can reproduce the sampling interval of the R signal or the B signal in the Bayer arrangement.

Therefore, it is general to design an optical system in such a manner that an image resolution for forming an image on an imaging element has spatial frequency characteristics that do not produce moire due to aliasing distortion with the sampling interval of the G signal.

Various types of methods for using such an optical system and reducing a false color have been conventionally proposed.

For example, JP-A 7-059098 (KOKAI) suggests a method for switching interpolation filters in adapting to the direction dependency of a G signal similarity in a local region of an image, an inter-color-signal similarity of a G signal and an R signal, or an inter-color-signal similarity of the G signal and a B signal.

That is, in JP-A 7-059098 (KOKAI), horizontal and vertical similarities of a total of four upper, lower, left and right G signals around a pixel position of a missing G signal are calculated, and the calculated similarities are compared with a predetermined threshold value to select one from three linear interpolation methods using the G signal.

FIGS. 15A to 15C show this interpolation method. FIG. 15A shows a method for calculating a similarity |G1−G2| of a G signal that is adjacent to a value X of a central G signal in the vertical direction and further executing a linear interpolation arithmetic operation "(G1−G2)/2". FIG. 15B shows a method for calculating a similarity |G3−G4| of a G signal that is adjacent to a value X of a central G signal in the horizontal direction and further executing a linear interpolation arithmetic operation "(G3+G4)/2". Furthermore, FIG. 15C shows a method for calculating similarities |G1−G2| and |G3−G4| of a G signal that is adjacent to a value X of a central G signal in the respective vertical and horizontal directions and further executing a linear interpolation arithmetic operation "(G1+G2+G3+G4)/4".

As described above, the technology disclosed in JP-A 7-059098 (KOKAI) selects one from the three linear interpolation methods.

Such a method has an inconvenience that, when an input single-chip color imaging signal has a band limiting effect reduced due to an optical low-pass filter and others and a phenomenon such as color moire due to frequency aliasing at the time of photoelectric conversion has been already included, jaggy is produced at an oblique edge (JP-A 7-059098 (KOKAI)).

BRIEF SUMMARY OF THE INVENTION

According to an aspect of the present invention, there is provided an image processing apparatus, comprising:

an imaging device in which a plurality of types of imaging elements having different spectral sensitivities are aligned on a single plane and which obtains a color imaging signal;

first edge direction judging unit which judges a direction along which an edge is produced in the color imaging signal based on pixel values of the respective imaging elements;

a high-color difference region judging unit which judges a region where the pixel values have a high-color difference equal to above a predetermined value when the first edge direction judging unit determines that the direction of the edge is other than a specific direction;

Further, according to an aspect of the present invention, there is provided an image processing method, comprising:

a first edge direction judging step of judging a direction along which an edge is produced in a color imaging signal based on pixel values of a plurality of types of imaging elements from an imaging device in which the respective imaging elements having different spectral sensitivities are aligned on a single plane and which obtains the color imaging signal;

a high-color difference region judging step of judging a region where the pixel values have a high-color difference equal to or above a predetermined value when it is determined that the direction of the edge is other than a specific direction at the first edge direction judging step;

a second edge direction judging step of further judging a direction of the edge when the region where the pixel values have the high-color difference is determined at the high-color difference judging step;

a direction dependence smoothing step of smoothing the pixel values of the respective imaging elements by interpolating them along the direction determined at the second edge direction judging step; and an omnidirectional smoothing step of smoothing the pixel values of the respective imaging elements in all directions based on pixel, values of peripheral pixels when it is determined that there is no edge in all directions at the second edge direction judging step.

Moreover, according to an aspect of the present invention, there is provided a program that is executed by a built-in computer in an apparatus including an imaging device in which a plurality of types of imaging elements having different spectral sensitivities are aligned on a single plane and which obtains a color imaging signal, the program allowing the computer to execute:

a first edge direction judging step of judging a direction along which an edge is produced in the color imaging signal based on pixel values of the respective imaging elements;

a high-color difference region judging step of judging a region where the pixel values have a high-color difference equal to or above a predetermined value when it is determined that the direction of the edge is other than a specific direction at the first edge direction judging step;

a second edge direction judging step of further judging a direction of the edge when the region where the pixel values have the high-color difference is determined at the high-color difference judging step;

a direction dependence smoothing step of smoothing the pixel values of the respective, imaging elements by interpolating them along the direction determined at the second edge direction judging step; and an omnidirectional smoothing step of smoothing the pixel values of the respective imaging elements in all directions based on pixel values of peripheral pixels when it is determined that there is no edge in all directions at the second edge direction judging step.

BRIEF DESCRIPTION OF THE SEVERAL VIEWS OF THE DRAWING

FIG. 7A is a view showing positions on the Bayer arrangement of respective color difference signals calculated based on vertical interpolation, lateral interpolation, and adjacent four-pixel interpolation of a missing G signal position according to the embodiment;

FIG. 7B is a view showing positions on the Bayer arrangement of respective color difference signals calculated based on the vertical interpolation, the lateral interpolation, and the adjacent four-pixel interpolation of the missing G signal position according to the embodiment;

FIG. 7C is a view showing positions on the Bayer arrangement of respective color difference signals a calculated based on the vertical interpolation, the lateral interpolation, and the adjacent four-pixel interpolation of the missing G signal position according to the embodiment;

FIG. 8A is a view showing an example of an interpolation processing unit for G signals in an interpolation processing unit according to the embodiment;

FIG. 8B is a view showing an example of an interpolation processing unit for R−Gi signals in the interpolation processing unit according to the embodiment;

FIG. 8C is a view showing an example of an interpolation processing unit for B−Gi signals in the interpolation processing unit according to the embodiment;

FIG. 10A is a view showing interpolation filter coefficients for G signals in the interpolation processing unit according to the embodiment;

FIG. 10B is a view showing interpolation filter coefficients for R−Gi signals or B−Gi signals in the interpolation processing unit according to the embodiment;

FIG. 10C is a view showing interpolation filter coefficients for R−Gi signals or B−Gi signals in the interpolation processing unit according to the embodiment;

FIG. 10D is a view showing interpolation filter coefficients for R−Gi signals or B−Gi signals in the interpolation processing unit according to the embodiment;

FIG. 10E is a view showing interpolation filter coefficients for R−Gi signals or B−Gi signals in the interpolation processing unit according to the embodiment;

FIG. 12 is a flowchart showing a sub-routine of high-color difference region processing in FIG. 11 according to the embodiment;

DETAILED DESCRIPTION OF THE INVENTION

An embodiment according to the present invention will now be described hereinafter with reference to the accompanying drawings.

Figure 1:
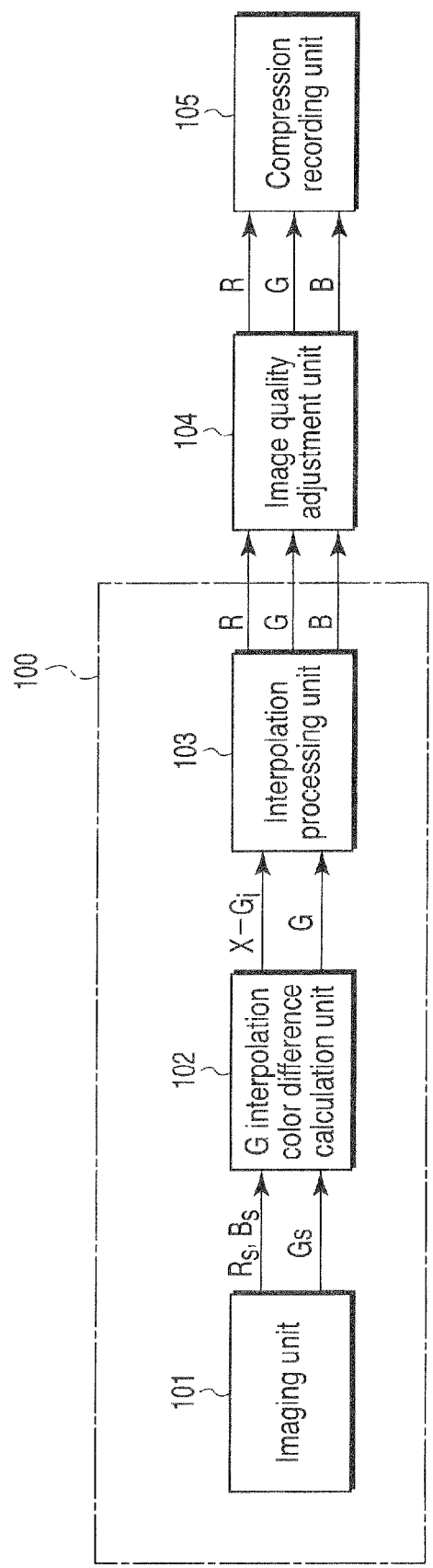
FIG. 1 is a functional block diagram showing an entire configuration including an image processing apparatus according to an embodiment of the present invention.

FIG. 1 is a functional block diagram showing an entire configuration of an image processing apparatus according to an embodiment of the present invention. As shown in the drawing, an image processing apparatus 100 includes an imaging unit 101, a G interpolation color difference calculation unit 102, and an interpolation processing unit 103.

The imaging unit 101 has a non-illustrated optical system lens, an Ir (infrared) cut filter, an optical low-pass filter, an imaging element consisting of an individual imaging device such as a single-chip CCD (Charged Coupled Device) or a CMOS image sensor including R, G, and B color filters, and a controller for the imaging element. Light whose image is formed on the single-chip imaging element through the lens, the Ir cut filter and the optical low-pass filter passes through predetermined color (RGB) filters formed in accordance with each pixel of the element, and then it is photoelectrically converted at each pixel.

An electric signal of each pixel subjected to the photoelectric conversion is amplified by an amplifier, subjected to A/D conversion, and output to the C interpolation color difference calculation unit 102 from this imaging unit 101 as color signals Rs, Gs and Bs. The controller in the imaging unit 101 separately outputs the color signals Rs and Bs and the color signal Gs to the G interpolation color difference calculation unit 102.

Moreover, the controller includes a noise reduction processing function, a white balance processing function and others for the respective color signals Rs and Bs and the color signal Gs, Rs, Bs and Gs output to the G interpolation color difference calculation unit 102 are subjected to processing based on these processing functions.

Figure 5A:
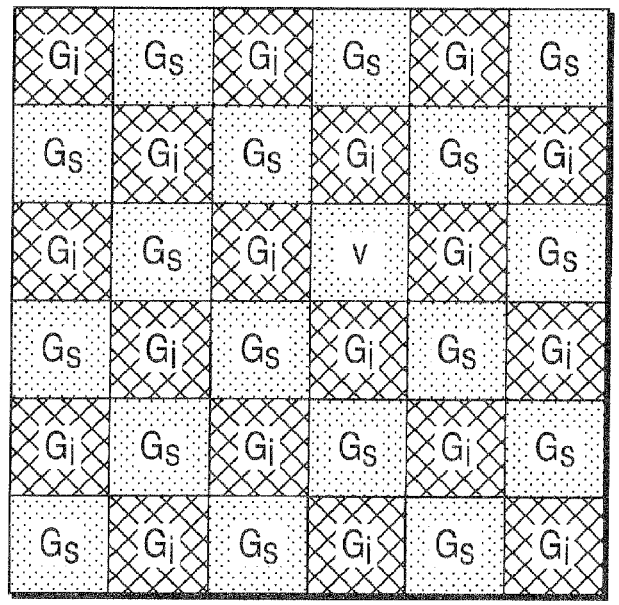
FIG. 5A is a view showing a two-dimensional arrangement of G signals output from the G interpolation color difference calculation unit according to the embodiment.
Figure 5B:
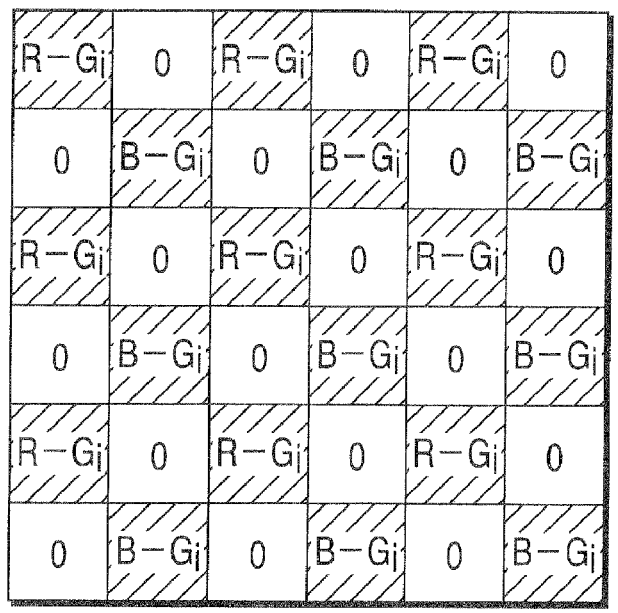
FIG. 5B is a view showing a two-dimensional arrangement of X-G signals output from the G interpolation color difference calculation unit according to the embodiment.
Figure 6:
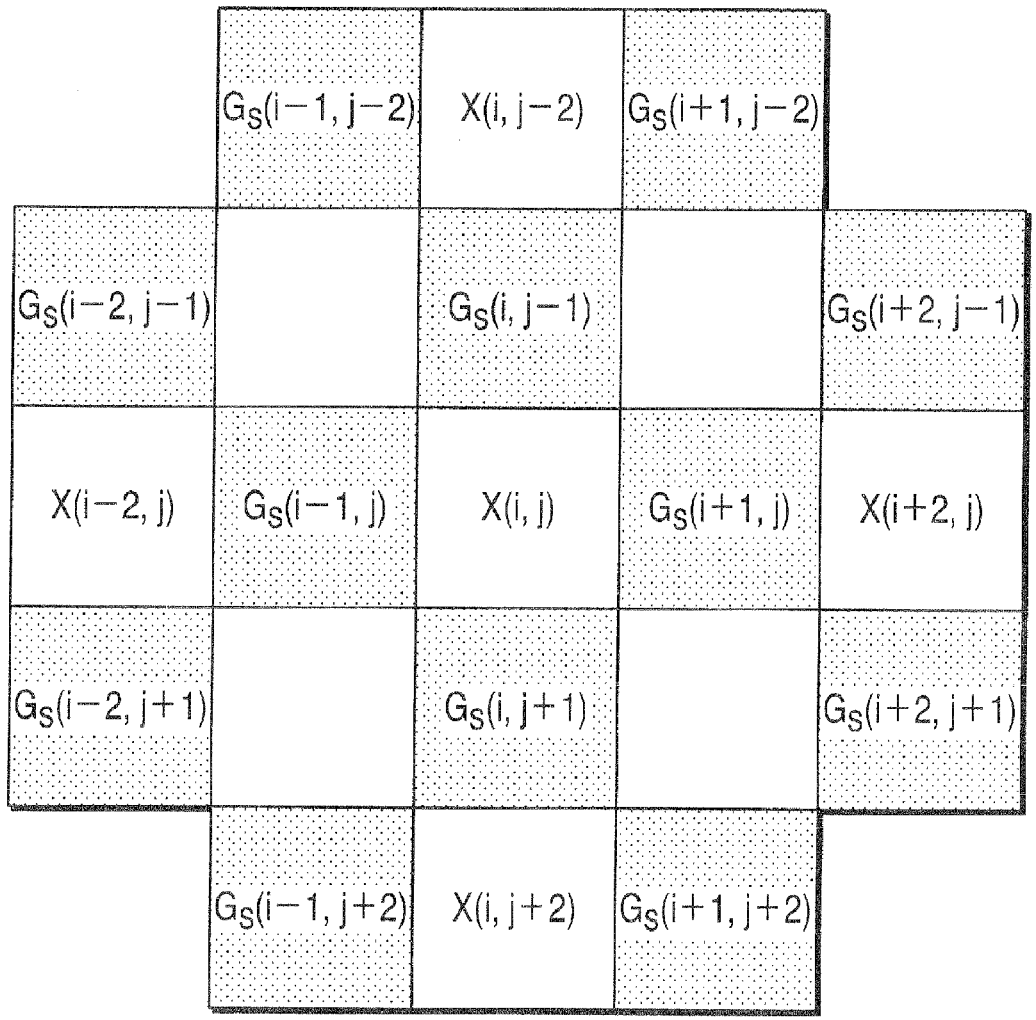
FIG. 6 is a view showing positions on a Bayer arrangement of color signals X when a low-pass filter processing unit according to this embodiment constitutes a low-pass filter.

The G interpolation color difference calculation unit 102 calculates color difference signals R–Gi and B–Gi of Gi as an interpolation G pixel associated with a pixel position of each of the input color signals Rs and Bs at the pixel position, and outputs the color difference signals R–Gi and B–Gi to the interpolation processing unit 103 in accordance with such a two-dimensional arrangement as shown in FIG. 5B in a raster scan order. Moreover, the G interpolation color difference calculation unit 102 also outputs each G signal to the interpolation processing unit 103 in accordance with such a two-dimensional arrangement as depicted in FIG. 5A in the raster scan order.

The interpolation processing unit 103 interpolates missing color difference signals R–G and B–G which are not arranged in FIG. 5B with the same peripheral color difference signals R–Gi and B–Gi and outputs the color difference signals R–G and B–G at all pixel positions to an image quality adjustment unit 104. On the other hand, the interpolation processing unit 103 likewise interpolates the color signals G with peripheral signals Gs and Gi arranged in FIG. 5A, and outputs the color signals to the image quality adjustment unit 104.

In this manner, the B, G and B signals at the respective pixel positions calculated by the interpolation processing unit 103 are input to the image quality adjustment unit 104.

Figure 4:
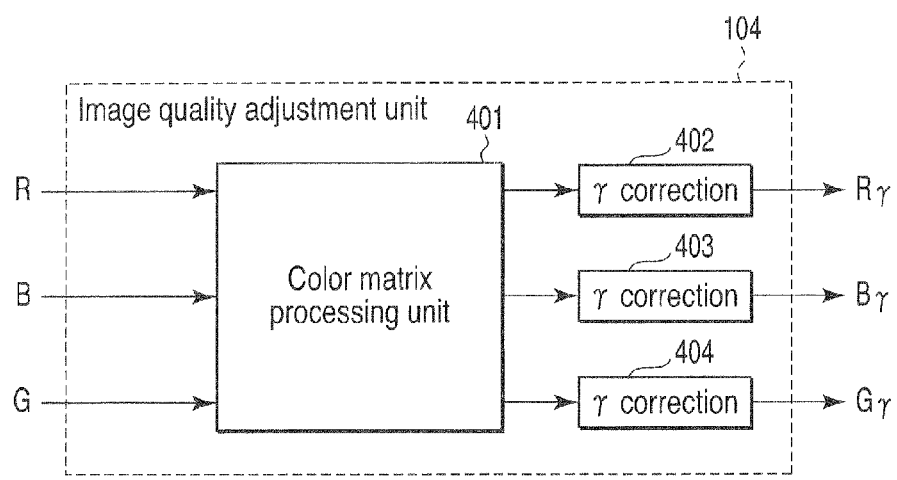
FIG. 4 is a functional block diagram showing detailed circuit configuration of an image quality adjustment unit in FIG. 1 according to the embodiment.

FIG. 4 is a view showing a detailed circuit configuration of the image quality adjustment unit 104. In this drawing, the B, G and B signals input to the image quality adjustment unit 104 are input to a color matrix processing unit 401 to be converted into, e.g., predetermined color spaces of sRGB.

As the converted R, G and B signals output from the color matrix processing unit 401, respective gradation signals each consisting of 12 bits are subjected to γ correction in γ correction units 402, 403 and 404 to be converted into signals each consisting of 8 bits, and they are output as Rγ, Gγ and Bγ signals to a compression recording unit 105 following the image quality adjustment unit 104.

The compression recording unit 105 performs image compression with to the signal R, G and B subjected to the γ correction, and records them in a flash memory, a hard disk device, or a magnetic tape constituting a recording medium.

A detailed circuit configuration of the G interpolation color difference calculation unit 102 will now be described with reference to FIG. 2.

Figure 2:
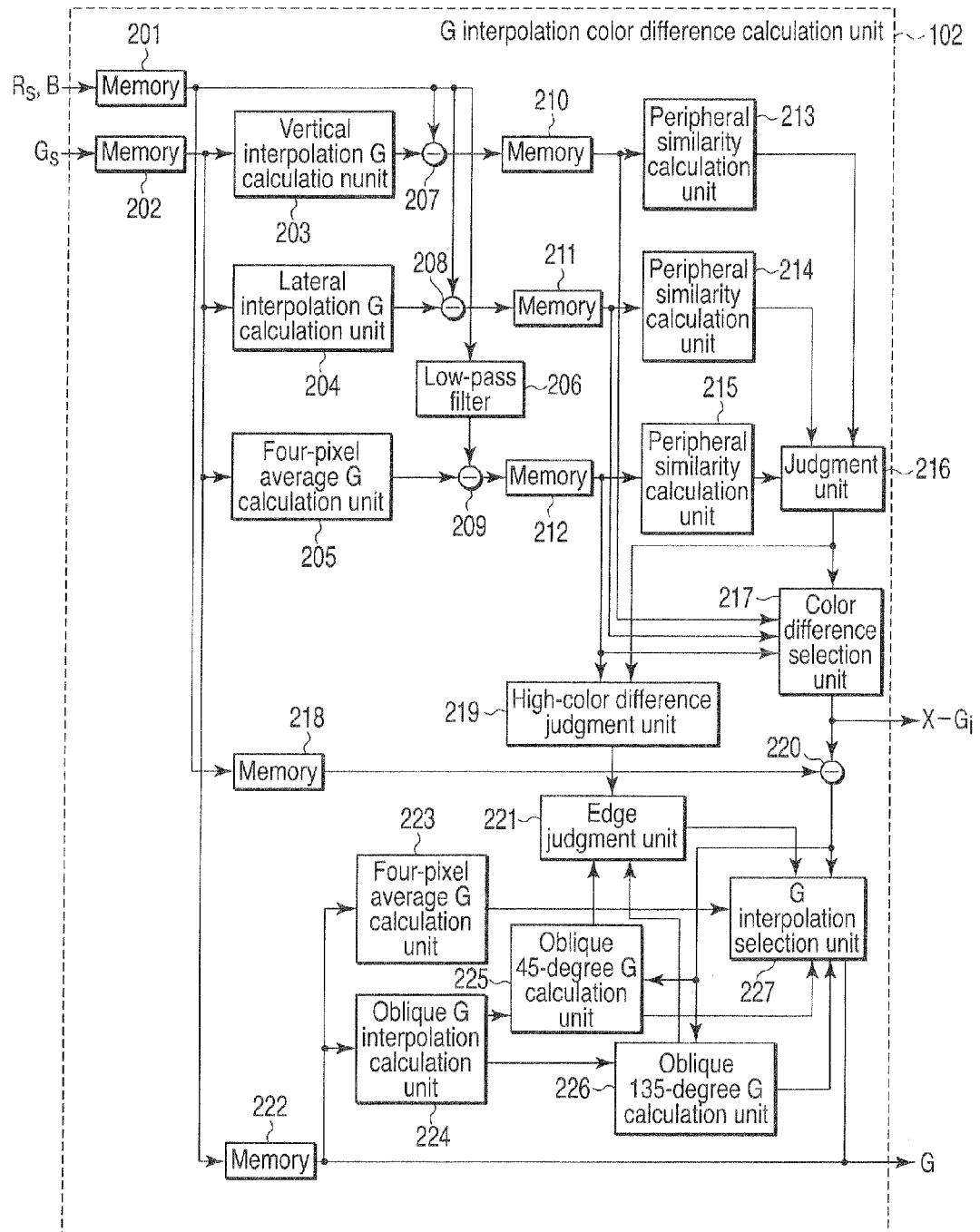
FIG. 2 is a functional block diagram showing a detailed circuit configuration of a G interpolation color difference calculation unit in FIG. 1 according to the embodiment.

In FIG. 2, the color signals Rs and Bs output from the imaging unit 101 are stored in a memory 201 and the color signal Gs is stored in a memory 202 for predetermined lines in order to obtain delay until pixels enabling two-dimensional interpolation processing at each missing G pixel position are completed. In the example depicted in FIG. 2. the number of lines stored in each of the memories 201 and 202 is at least 3.

Although an R pixel or a B pixel is at a position of a missing G pixel, these two color signals will be denoted as X or X pixels In the following description.

Figure 15A:
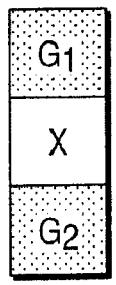
FIG. 15A is a view showing positions on the Bayer arrangement of adjacent G signals for use in the vertical interpolation for a missing G signal position.
Figure 15B:
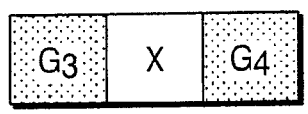
FIG. 15B is a view showing positions on the Bayer arrangement of adjacent G signals for use in the lateral interpolation for the missing G signal position.
Figure 15C:
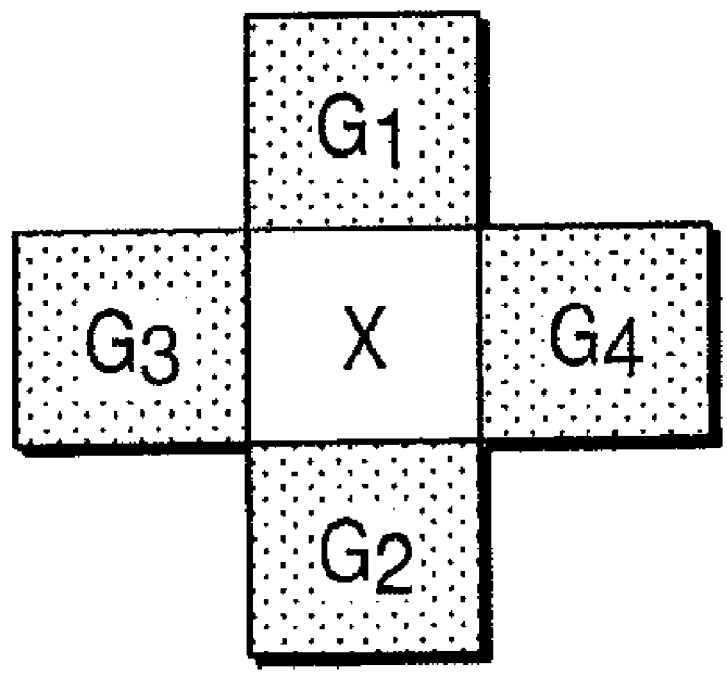
FIG. 15C is a view showing positions on the Bayer arrangement of adjacent G signals for use in the adjacent four-pixel interpolation for the missing G signal position.

As an interpolation method for the missing G pixel, three types of G pixel arrangement depicted in FIGS. 15S to 15S are used. Respective interpolants are as follows:

$Gv = (G1+G2)/2;$ $Gh = (G3+G4)/2;$ and $Ga = (G1+G2+G3+G4)/4$

The respective interpolation values are calculated by a vertical interpolation G calculation unit 203, a lateral interpolation G calculation unit 204 and a four-pixel interpolation G calculation unit 205, and then they are input to subtraction units 207, 208 and 209.

An X pixel placed at the same position as the missing G pixel stored in the memory 201 is input to the subtraction units 207 and 208, and it is further input to the subtraction unit 209 as an XL pixel having a high-frequency component removed therefrom through a low-pass filter 206.

Here, the low-pass filter 206 is calculated based on the following total of five pixels, i.e., the missing G pixel and the similar X pixels placed on upper, lower, left and right sides of this pixel: X(i,j), X(i,j+2), X(i,j−2), X(i−2, j), X(i+2,j) The low-pass filter executes filtering processing in accordance with the following expression:

$$XL(i, j) = \alpha X(i, j) + \beta(X(i, j+2) + X(i, j-2) + X(i-2, j) + X(i+2, j))$$

(where α, β: a weighted value approximated to spatial frequency characteristics in an oblique 45-degree direction of Ga calculated based on a peripheral four-pixel average of the missing G pixel)

Color difference signals X–Gv, X–Gh and XL–Ga calculated by the subtraction units 207, 208 and 209 are stored in memories 210, 211 and 212, respectively.

Figures 7A, 7B:
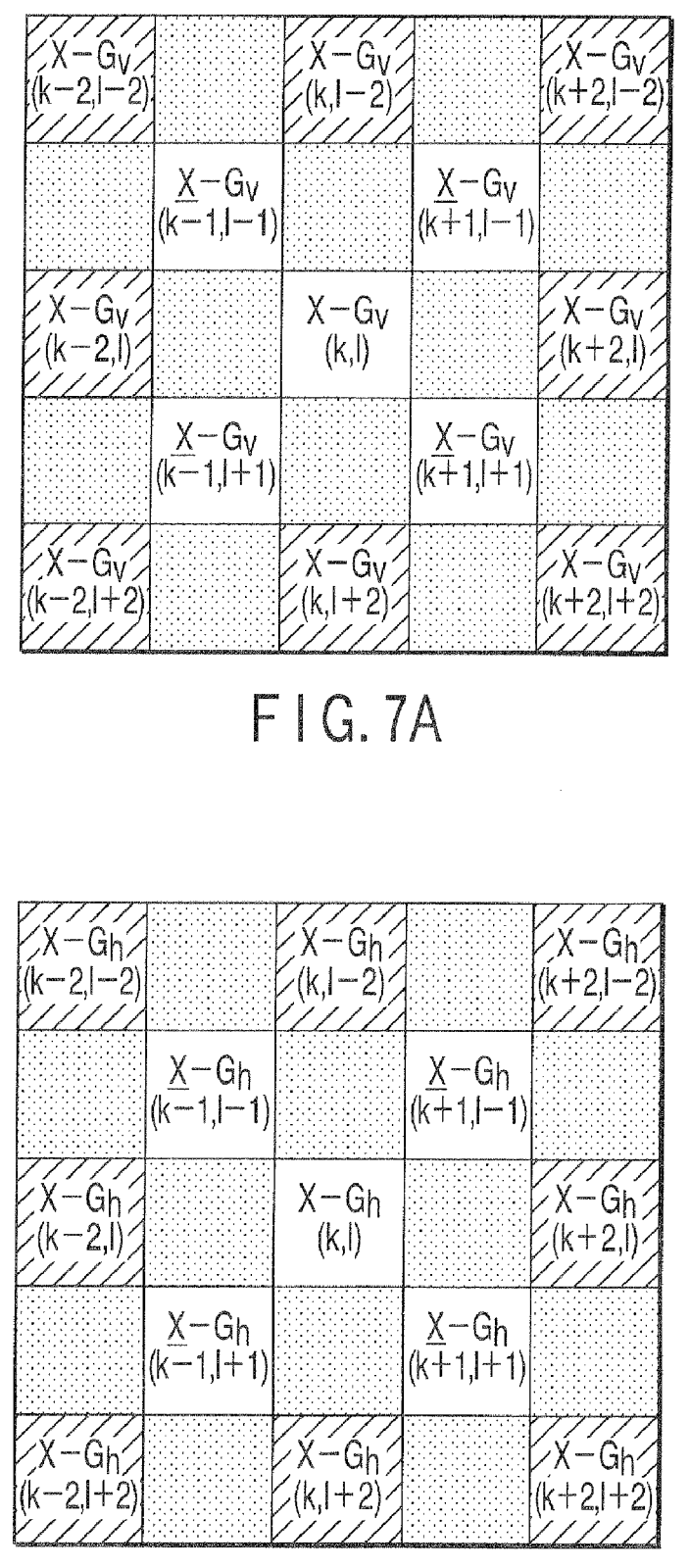
Figures 7C, 8A:
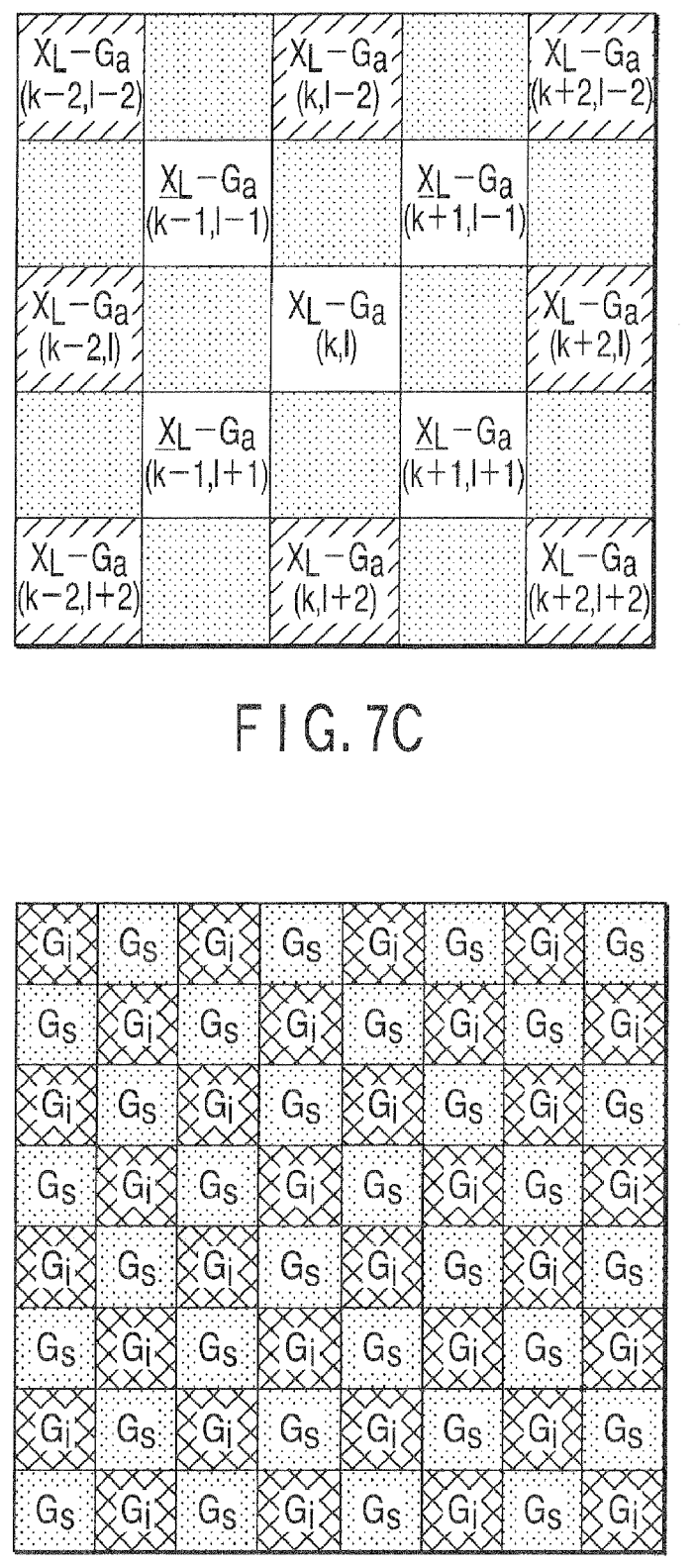

The memories 210, 211 and 212 are provided to obtain delay for executing similarity calculation processing in a near-field region including three rows and three columns of color difference signals depicted in FIGS. 7A to 7C with respect to the color difference signals. In this embodiment, the number of lines stored in each of the memories 210, 211 and 212 is at least 5.

When the color difference signals that enable executing peripheral similarity calculation processing of color differences are stored in the memories 210, 211 and 212, the predetermined color difference signals X–Gv, X–Gh and XL–Ga are output from these memories 210, 211 and 212 to peripheral similarity calculation units 213, 214 and 215, respectively.

As shown in FIG. 7A, the peripheral similarity calculation unit 213 defines a color difference peripheral similarity Sv(k,l) at a missing G pixel position (k,l) as a sum of a central color difference signal $(X-Gv)_{k,l}$, $Sv1(k,l)$ using eight color differences at peripheral positions of the central color difference signal, and $Sv2(k,l)$ using $(\underline{X}-Gv)_{k-1,l-1}$, $(\underline{X}-Gv)_{k+1,l-1}$, $(X-Gv)_{k-1,l+1}$ and $(\underline{X}-Gv)_{k-1,l+1}$. $Sv1(k,l)$ uses the following eight color differences at peripheral positions:
$(X-Gv)_{k-2,l-2}$, $(X-Gv)_{k,l-2}$,
$(X-Gv)_{k+2,l-2}$, $(X-Gv)_{k-2,l}$,
$(X-Gv)_{k+2,l}$, $(X-Gv)_{k-2,l+2}$,
$(X-Gv)_{k,l+2}$, $(X-Gv)_{k+2,l+2}$
That is, the following expression is provided:

$$Sv(k,l)=Sv1(k,l)+Sv2(k,l)$$

$$Sv1(k,l)=\{|(X-Gv)_{k,l-2}-(X-Gv)_{k,l}|+|(X-Gv)_{k,l+2}-\\(X-Gv)_{k,l}|\}\times Wv_{cX}+\{|(X-Gv)_{k-2,l-2}-(X-Gv)_{k-2,l}|+\\|(X-Gv)_{k-2,l+2}-(X-Gv)_{k-2,l}|+|(X-Gv)_{k+2,l-2}-\\(X-Gv)_{k+2,l}|+|(X-Gv)_{k+2,l+2}-(X-Gv)_{k+2,l}|\}Wv_{aX}$$

$$Sv2(k,l)=\{|\underline{X}-Gv\}_{k-1,l-1}-(\underline{X}-Gv)_{k-1,k+1}|+\\|(\underline{X}-\overline{Gv})_{k+1,l-1}-(\underline{X}-\overline{Gv})_{k+1,l+1}|\}\times Wv_{\underline{X}} \quad \text{[Expression 1]}$$

(where $Wv_{cX}$, $Wv_{aX}$ and $Wv_{\underline{X}}$ have a relationship of $Wv_{cX}+2\times Wv_{aX}=Wv_{\underline{X}}$)

Likewise, as shown in FIG. 7B, the peripheral similarity calculation unit 214 defines a color difference peripheral similarity $Sh(k,l)$ at the missing G pixel position $(k,l)$ as a sum of a central color difference signal $(X-Gh)_{k,l}$, $Sh1(k,l)$ using eight color differences at peripheral positions of the central color difference signal, and $Sh2(k,l)$ using $(\underline{X}-Gh)_{k-1,l-1}$, $(\underline{X}-Gh)_{k+1,l-1}$, $(\underline{X}-Gh)_{k-1,l+1}$ and $(\underline{X}-\overline{Gh})_{k-1,l+1}$. $Sh1(k,l)$ uses the following eight color differences peripheral positions:
$(X-Gv)_{k-2,l-2}$, $(X-Gv)_{k,l-2}$,
$(X-Gv)_{k+2,l-2}$, $(X-Gv)_{k-2,l}$,
$(X-Gv)_{k+2,l}$, $(X-Gv)_{k-2,l+2}$,
$(X-Gv)_{k,l+2}$, $(X-Gv)_{k+2,l+2}$
That is, the following expression is provided:

$$Sh(k,l)=Sh1(k,l)+Sh2(k,l)$$

$$Sh1(k,l)=\{|(X-Gh)_{k-2,l}-(X-Gh)_{k,l}|+|(X-Gh)_{k+2,l}-\\(X-Gh)_{k,l}|\}\times Wh_{cX}+\{|(X-Gh)_{k-2,l-2}-(X-Gh)_{k,l-2}|+\\|(X-Gh)_{k+2,l-2}-(X-Gh)_{k,l-2}|+|(X-Gh)_{k-2,l+2}-\\(X-Gh)_{k,l+2}|+|(X-Gh)_{k+2,l+2}-(x-Gh)_{k,l+2}|\}Wh_{aX}$$

$$Sh2(k,l)=\{|\underline{X}-Gh\}_{k-1,l-1}-(\underline{X}-Gh)_{k+1,l-1}|+\\|(\underline{X}-\overline{Gh})_{k-1,l+1}-(\underline{X}-\overline{Gh})_{k+1,l+1}|\}\times Wh_{\underline{X}} \quad \text{[Expression 2]}$$

(where $Wh_{cX}$, $Wh_{aX}$ and $Wh_{\underline{X}}$ have a relationship of $Wh_{cX}+2\times Wh_{aX}=Wh_{\underline{X}}$)

Further, as shown in FIG. 7C, the peripheral similarity calculation unit 215 defines a color difference peripheral similarity $Sa(k,l)$ at the missing G pixel position $(k,l)$ as a sum of a central color difference signal $(X_L-Ga)_{k,l}$, $Sa1(k,l)$ using eight color differences at peripheral positions of the central color difference signal, and $Sa2(k,l)$ using $(\underline{X}_L-Ga)_{k-1,l-1}$, $(\underline{X}_L-Ga)_{k+1,l-1}$, $(\underline{X}_L-Ga)_{k-1,l+1}$ and $(\underline{X}_L-Ga)_{k-1,l+1}$. $Sa1(k,l)$ uses the following eight color differences at peripheral positions:
$(X_L-Ga)_{k-2,l-2}$, $(X_L-Ga)_{k,l-2}$,
$(X_L-Ga)_{k+2,l-2}$, $(X_L-Ga)_{k-2,l}$,
$(X_L-Ga)_{k+2,l}$, $(X_L-Ga)_{k-2,l+2}$,
$(X_L-Ga)_{k,l+2}$, $(X_L-Ga)_{k+2,l+2}$
That is, the following expression is provided:

$$Sa(k,l)=Sa1(k,l)+Sa2(k,l)$$

$$Sa1(k,l)=\{|(X_L-Ga)_{k-2,l-2}-(X_L-Ga)_{k,l}|+|(X_L-Ga)_{k,l-2}-\\(X_L-Ga)_{k,l}|+|(X_L-Ga)_{k-2,l-2}-(X_L-Ga)_{k,l}|+\\|(X_L-Ga)_{k-2,l}-(X_L-Ga)_{k,l}|+|(X_L-Ga)_{k+2,l}-\\(X_L-Ga)_{k,l}|+|(X_L-Ga)_{k-2,l+2}-(X_L-Ga)_{k,l}|+\\|(X_L-Ga)_{k,l+2}-(X_L-Ga)_{k,l}|+|(X_L-Ga)_{k+2,l+2}-\\(X_L-Ga)_{k,l}|\}Wa_X$$

$$a2(k,l)=\{|\underline{X}_L-Ga\}_{k-1,l-1}-(\underline{X}_L-Ga)_{k+1,l+1}|+\\|(\underline{X}_L-\overline{Ga})_{k-1,l+1}-(\underline{X}_L-\overline{Ga})_{k+1,l-1}|\}\times Wa_X \quad \text{[Expression 3]}$$

(where $Wa_X$, $Wa_{\underline{X}}$ and have a relationship of $4\times Wa_X=Wa_{\underline{X}}$)

The calculated three color difference peripheral similarities $Sv(k,l)$, $Sh(k,l)$ and $Sa(k,l)$ are input to a judgment unit 216.

This judgment unit 216 selects a minimum one from the three color difference peripheral similarities $Sv(k,l)$, $Sh(k,l)$ and $Sa(k,l)$. Furthermore, a selection signal indicative of a direction associated with this selected color difference peripheral similarity is input to a color difference selection unit 217 and a high-color difference judgment unit 219. When the judgment unit 216 selects a minimum one from the color difference peripheral similarities $Sv(k,l)$, $Sh(k,l)$ and $Sa(k,l)$ in this manner, a direction along which an edge is generated can be determined.

Color difference candidates $(X-Gv)k,l$, $(X-Gh)k,l$ and $(XL-Ga)k,l$ associated with the missing G pixel position $(k,l)$ are input to the color difference selection unit 217 from the memories 210, 211 and 212. Moreover, this color difference selection unit 217 selects and outputs one color difference associated with the selection signal input from the judgment unit 216.

Specifically, when the color difference peripheral similarity $Sv(k,l)$ is minimum, the color difference selection unit 217 outputs $(X-Gv)k,l$. Likewise, when $Sh(k,l)$ is minimum, the color difference selection unit 217 outputs $(X-Gh)k,l$. Additionally, when $Sa(k,l)$ is minimum, the color difference selection unit 217 outputs $(XL-Ga)k,l$.

The color difference signal is output to the color difference interpolation processing unit 103 in a raster scan order for scanning such a two-dimensional arrangement as depicted in FIG. 5B from an upper left side toward a lower right side. The interpolation processing unit 103 separates R−Gi and B−Gi from each other and interpolates a pixel position of each missing color difference signal with R−Gi or B−Gi provided in the periphery.

Further, the memory 218 is provided to temporarily save a value of an X pixel that is present as an imaging pixel, and performs adjustment for a timing of selecting and outputting one of the color difference signals X−Gv, X−Gh and XL−GA, and reads out its held contents to a subtraction unit 220.

The subtraction unit 220 executes the following subtraction processing by using one of the color differences X−Gv, X−Gh and XL−Ga at the same pixel position and X to calculate a Gi signal at the missing G pixel position. That is, the following expressions can be achieved:

When the color difference $X-Gv$ is selected:
$Gi=X-(X-Gv);$

When the color difference $X-Gh$ is selected:
$Gi=X-(X-Gh);$ and

When the color difference $XL-Ga$ is selected:
$Gi=X-(XL-Ga)$

Furthermore, the color difference $(XL-Ga)$ stored in the memory 212 is input to the high-color difference judgment unit 219, and the high-color difference judgment unit 219 compares this color difference with a predetermined threshold value THc (e.g., a value that is approximately a maximum gradation value/10).

When the color difference $(XL-Ga)>THc$ is achieved as a result of this comparison and the selection signal output from the judgment unit 216 is a selection signal that selects a direction associated with the color difference $(XL-Ga)$, the high-color difference judgment unit 219 outputs "non-high-color difference: 00" or "high-color difference: 01" to an edge judgment unit 221 as a change request signal for changing the G interpolation. The high-color difference judgment unit 219 outputs the "high-color difference: 01" when the color difference $(XL-Ga)>THc$. Furthermore, the high-color difference judgment unit 219 outputs the "non-high-color difference: 00" when the color difference $(XL-Ga)\leq THc$.

When the change request signal from the high-color difference judgment unit 219 is the "non-high-color difference: 00", the edge judgment unit 221 outputs this change request signal to a G interpolation selection unit 227 as it is.

On the other hand, when the request signal from the high-color-difference judgment unit 219 is the "high-color difference: 01", the edge judgment unit 221 compares an oblique 45-degree edge interpolation value s45 input from a later-described oblique 45-degree G calculation unit 225 with an oblique 135-degree edge interpolation value s135 input from a later-described oblique 135-degree G calculation unit 226 to judge whether an edge is present. For example, the edge judgment unit 221 compares a difference between the oblique 45-degree edge interpolation value s45 and the oblique 135-degree edge interpolation value s135 with a predetermined threshold value EdgeTH (e.g., a value that is approximately the maximum gradation value/16), and it determines that the edge is present when she following expression is achieved:

$$|s45-s135|>\text{EdgeTH}$$

Furthermore, the edge judgment unit 221 determines that there is no edge is flat portion) when the following expression is achieved:

$$|s45-s135|\leq\text{EdgeTH}$$

When the edge is present, the edge judgment unit 221 determines a direction along which the edge is present. For example, the edge judgment unit 221 compares a difference between an output Gi from the subtraction unit 220 and the oblique 45-degree edge interpolation value s45 with a difference between the output Gi from the subtraction unit 220 and the oblique 135-degree edge interpolation value s135, and it determines that the edge is present in a direction of 45 degrees when the following expression is achieved:

$$|Gi-s45|<|Gi-s135|$$

Moreover, the edge judgment unit 221 determines that the edge is present in a direction of 135 degrees when the following expression is achieved:

$$|Gi-s45|\geq|Gi-s135|$$

Additionally, based on this judgment result, the edge judgment unit 221 outputs "high-color difference and non-edge: 01", "high-color difference and 45-degree edge: 10" or "high-color difference and 135-degree edge: 11" to the G interpolation selection unit 227 as a change request signal.

The four-pixel average G calculation unit 223 creates an average value of four pixels adjacent to the pixel X(k,l) on upper, lower, left and right sides, i.e., G(k−1,l), G(k,l−1), G(k−1,l) and G(k,l+1) as interpolation Ga of the missing G pixel position from the G signal stored in the memory 222, and it outputs this interpolation to the G interpolation selection unit 227.

Figure 9:
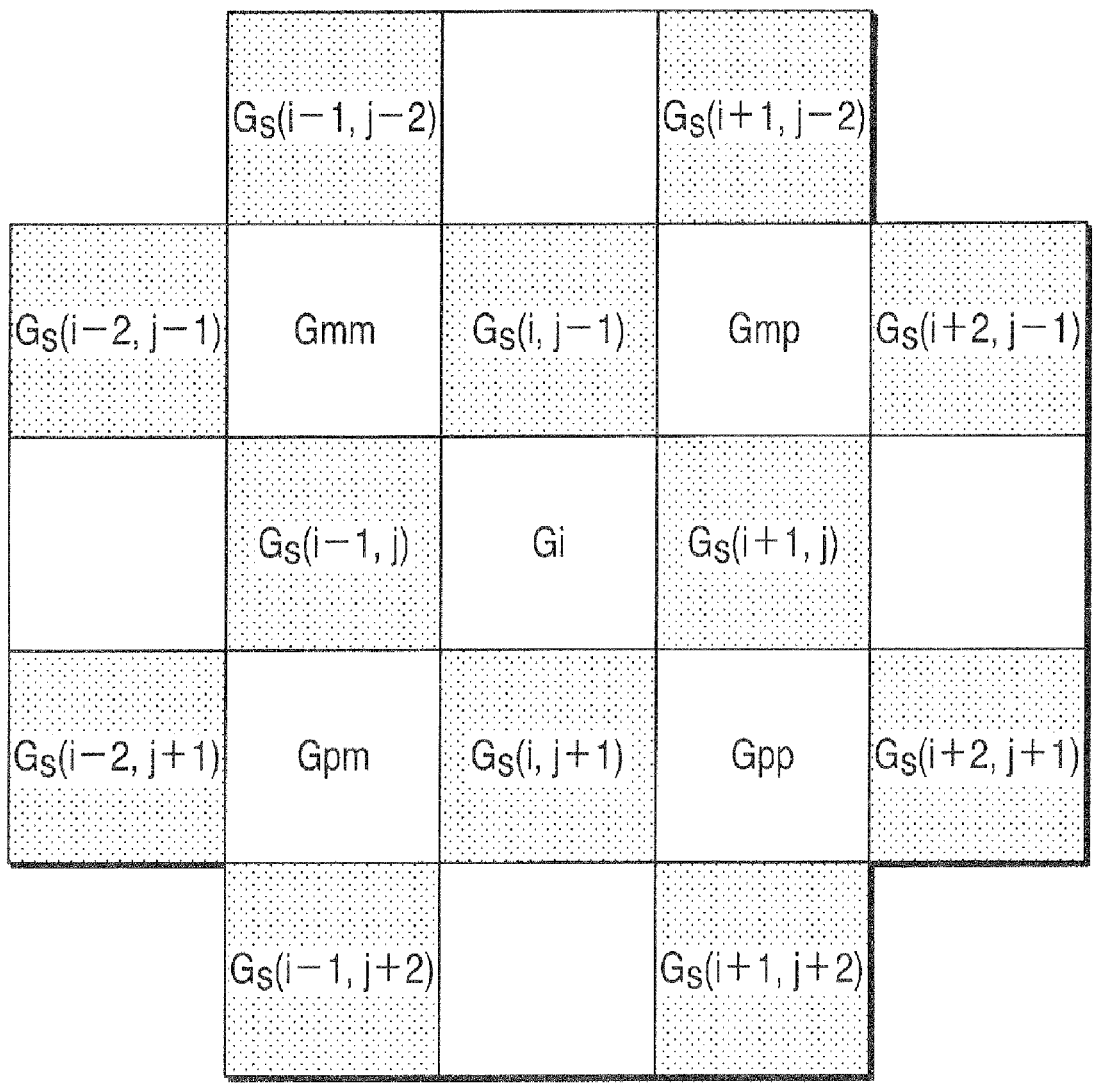
FIG. 9 is a view showing interpolation values obtained for four oblique pixel positions of a missing G signal and positions on the Bayer arrangement of adjacent G signals in upper, lower, left and right directions according to the embodiment.

The oblique G interpolation calculation unit 224 calculates average values Gmm, Gmp, Gpm and Gpp of G pixel values which neighbor on upper, lower, left and right sides X(k−1, l−1), X(k−1,l+1), X(k+1,l−1) and X(k+1,l+1) obliquely placed with respect to the pixel X(k,l) from a G(Gi) signal stored in the memory 222, and it outputs the calculation results to the oblique 45-degree calculation unit 225 and the oblique 135-degree calculation unit 226. Gmm, Gmp, Gpm and Gpp depicted in FIG. 9 are as follows. That is, the following expressions are achieved:

$$Gmm=(G(i-1,j-2)+G(i,j-1)+G(i-1,j-2)+G(i-1,j))/4$$

$$Gmp=(G(i,j-1)+G(i+2,j-1)+G(i+1,j-2)+G(i+1,j))/4$$

$$Gpm=((i-2,j+1)+G(i,j+1)+G(i-1,j)+G(i-1,j+2))/4$$

$$Gpp=(G(i,j+1)+G(i+2,j+1)+G(i+1,j)+G(j+1,j+2))/4$$

The oblique 45-degree calculation unit 225 calculates the oblique 45-degree interpolation value s45 based on the G pixel interpolation values Gmm, Gmp, Gpm and Gpp which are placed at the oblique positions with respect to the pixel X(k,l) and input from the oblique interpolation calculation unit 224 and the G interpolation value Gi calculated in the subtraction unit 220, and it outputs the calculated value to the edge judgment unit 221 and the interpolation selection unit 227.

On the other hand, the oblique 135-degree G calculation unit 226 calculates the oblique 135-degree interpolation value s135 based on the G pixel interpolation values Gmm, Gmp, Gpm and Gpp which are placed at the oblique positions of the pixel X(k,l) and input from the oblique G interpolation calculation unit 226 and the G interpolation value Gi calculated in the subtraction unit 220, and it outputs the calculated value to the edge judgment unit 221 and the G interpolation selection unit 227.

Giving a detailed description of this point, the following expressions can be achieved in FIG. 9:

$$s45=((2*Gi)+Gmm+Gpp)/4$$

$$s135=((2*Gi)+Gmp+Gpm)/4$$

The G interpolation selection unit 227 receives the G signal interpolation value Gi at the missing G pixel position (k,l) as an output from the subtraction unit 220, the interpolation value Ga as an output from the four-pixel average calculation unit 223, the oblique 45-degree interpolation value s45 as an output from the oblique 45-degree G calculation unit 225, the oblique 135-degree interpolation value s135 as an output from the oblique 135-degree G calculation unit 226, and the change request signal from the edge judgment unit 221, performs selection in accordance with contents of the change request signal, and outputs the selection result to the subsequent interpolation processing unit 103.

That is, when the change request signal is indicative of "non-high-color difference: 00", the C interpolation selection unit 227 selects the G interpolation value Gi calculated in the subtraction unit 220. When the change request signal is indicative of "high-color difference and non-edge: 01", the G interpolation selection unit 227 selects Ga as an output from the four-pixel average G calculation unit 223. When the change request is indicative of "high-color difference and 45-degree edge: 10", the G interpolation selection unit 227 selects s45 as an output from the oblique 45-degree G calculation unit 225. Moreover, when the change request is indicative of "high-color difference and 135-degree edge: 11", the G interpolation selection unit 227 selects s135 as an output from the oblique 135-degree G calculation unit 226.

Figure 3:
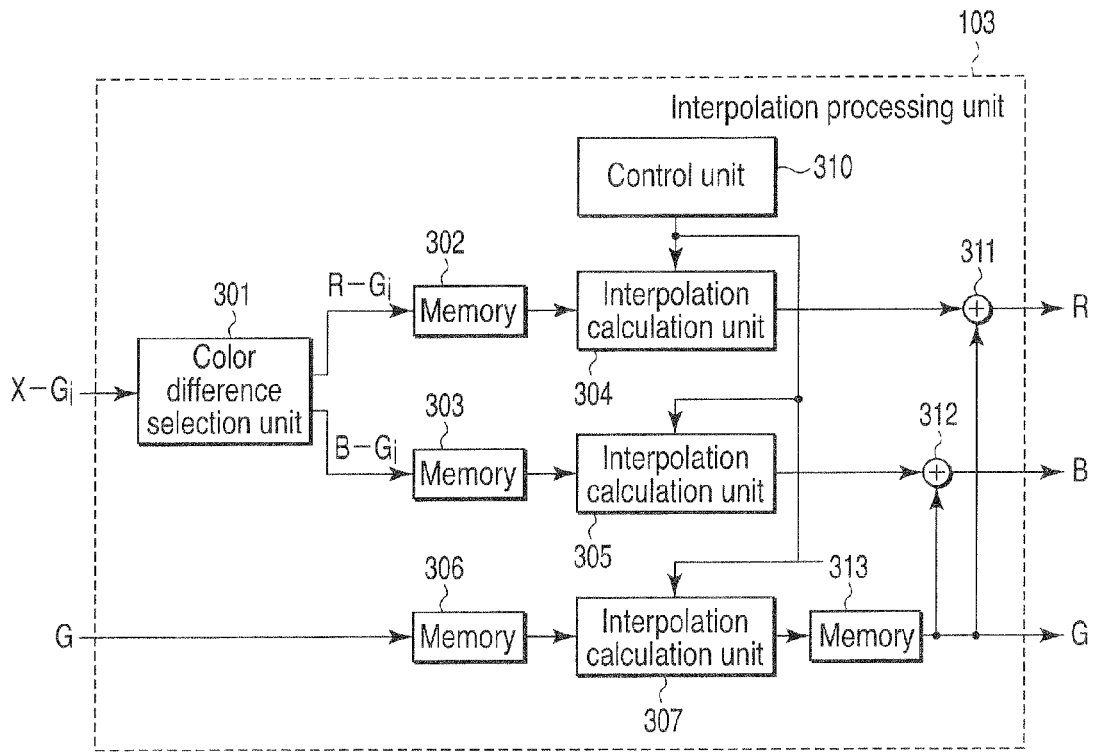
FIG. 3 is a functional block diagram showing a detailed circuit configuration of an interpolation processing unit in FIG. 1 according to the embodiment.

The detail of the interpolation processing unit 103 will now be described with reference to FIG. 3.

To the interpolation processing unit 103 are input the G signal having the two-dimensional arrangement configuration depicted in FIG. 5 output from the G interpolation color difference calculation unit 102 and a color difference X−Gi signal having the two-dimensional arrangement configuration depicted in FIG. 5B.

This color difference X−Gi signal output from the G interpolation color difference calculation processing unit 102 is first input to a color difference screening unit 301 in the interpolation processing unit 103. This color difference screening unit 301 divides the color difference X−Gi signal into a color difference R−Gi signal and a color difference B−Gi signal to be stored in memories 302 and 303, respectively.

The color difference signal R–Gi signal and the color difference. B–Gi signal stored in the memories 302 and 303 in this manner are stored for the number of lines required for the interpolation processing for respective predetermined positions, and pixels required for the interpolation processing are read to interpolation calculation units 304 and 305 when the interpolation processing can be started.

The interpolation calculation units 304 and 305 calculates and outputs a color difference R–G signal and a color difference B–G signal, as interpolation pixels based on an interpolation filter coefficient supplied from a control unit 310.

On the other hand, the G signal from the preceding G interpolation color different calculation unit 102 is stored in a memory 306. The G signal stored in this memory 306 is stored for the number of lines required for the interpolation processing for respective predetermined positions, and pixels required for the interpolation processing are read to an interpolation calculation unit 307 when the interpolation processing can be started.

This interpolation calculation unit 307 calculates and outputs the G signal as an interpolation pixel based on the interpolation filter coefficient supplied from the control unit 310.

Figures 8B, 8C:
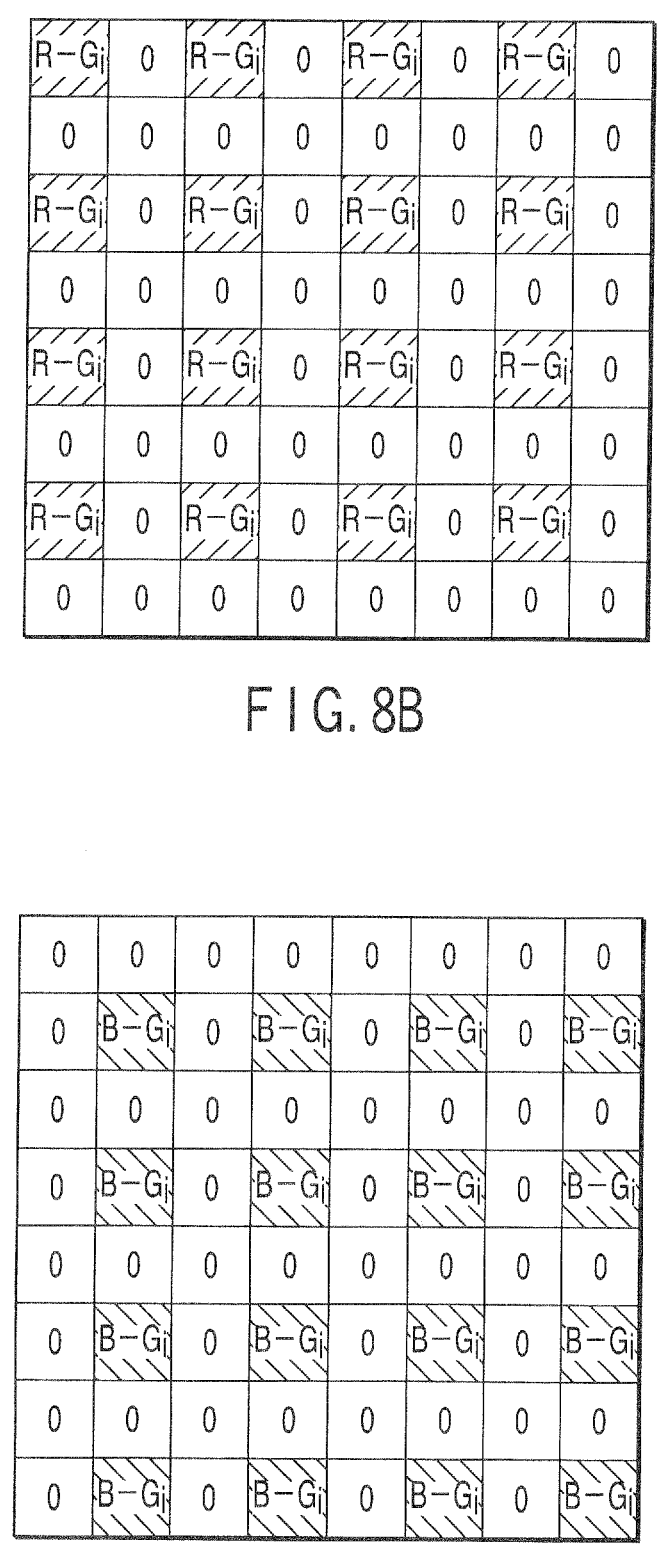

The interpolation calculation processing in the interpolation calculation units 304, 305 and 307 is, e.g., processing for a region of 8×8 pixels depicted in FIGS. 8A to 8C, and it is, e.g., processing for creating pixels at ½ pixel positions in both the horizontal and vertical directions when a pixel size with the same resolution as that of the imaging element is specified.

As an example of an interpolation filter utilized in the interpolation calculation processing, there is use of a convolution filter such as a Lanczos filter. In this example, an interpolation pixel is calculated by performing one-dimensional filtering in the vertical direction with respect to a result of the one-dimensional filtering effected in the horizontal direction.

Such one-dimensional filtering may be substituted two-dimensional filtering. For example, FIGS. 10A to 10E show an example of a two-dimensional filter having 8×8 taps. FIG. 10A is a view showing an example of a filter for the G signal.

Further, FIGS. 10B to 10E are views showing an example of using the control unit 310 to appropriately switch four filters for the color difference R–Gi signal and the color difference B–Gi signal based on a positional relationship between an interpolation pixel position and the color difference R–Gi or B–Gi.

Here, an interpolation filter coefficient fij for the G signal and an interpolation filter coefficient fij for the color differences may be the same coefficient fij=fij, or they may be different filter coefficients fij≠fij for further applying band limitation to the color differences.

It is to be noted that the number of the taps of the interpolation filter is 8×8, but N×N taps (here, N is a multiple of 4) may be adopted based on the trade-off of a hardware scale and a degree of freedom in designing filter characteristics. Incidentally, it is needless to say that the number of taps may differ depending on the G signal, the color difference R–Gi signal and the color difference B–Gi signal, and a filter having the number of taps which is a multiple of 2 may be used for the G signal in this case.

Although the above has described that the processing of the G interpolation color difference calculation unit 102 and the interpolation processing unit 103 is realized by a hardware circuit, the same function can be readily realized by software processing using a DSP (Digital Signal Processor) which is a so-called pixel engine.

A specific procedure when realizing the function of the G interpolation color difference calculation unit 102 based on the software processing will now be described with reference to flowcharts of FIGS. 11 and 12.

First, color image signals stored in the memories after imaging by the imaging unit 101 are input to the interpolation color difference calculation unit 102 in a raster scan order, and the number of lines for which interpolation candidate values and color difference candidate values of a missing G signal are stored in the memory×the number of line pixels=the number of N pixels is set to an initial value in a state that predetermine data is stored in the memories 201 and 202, wherein the number of lines=5 is determined in this embodiment, for example (a step S2000).

Then, an average value Gv(i,j) of upper and lower adjacent G signals is calculated with respect to a G signal missing position (i,j), a color difference (X−Gv)i,j is calculated based on X(i,j) (X is R or B) present at the G signal missing position (i,j) and the interpolation candidate Gv(i,j), and these values are stored in the memories (a step S2001).

Subsequently, an average value of Gh(i,j) of left and right adjacent G signals is calculated with respect to the G signal missing position (i,j), a color difference (X−Gh)i,j is calculated based on X(i,j) (X is R or B) present at the G signal missing position and the interpolation candidate Gh(i,j), and these values are stored in the memories (a step S2002).

Moreover, an average value Ga(i,j) of upper, lower, left and right adjacent G signals is calculated with respect to the G signal missing position (i,j), band limitation processing (a low-pass filter) for approximating frequency characteristics of the oblique 45-degree direction to characteristics of the interpolation filter at the time of calculating the average value Ga(i,j) is carried out by using X(i,j) (X is R or B) present at the G signal missing position (i,j) and X(i−2,l), X(i+2,j), X(i,j−2) and X(i,j+2) provided on peripheral upper, lower, left and right sides, and a color difference (XL−Ga)i,j is calculated based on the calculated XL(i,j) and the interpolation candidate Ga(i,j) to be stored in the memory (a step S2003).

Whether the processing for the N pixels has been terminated at this point in time is judged (?a step 2004 (32004)?)

When the processing for the N pixels has not been terminated, the control returns to the step S2001 to continue an operation for calculating (X−Gv)i,j, (X−Gh)i,j and (XL−Ga)i,j to be stored in the memories.

On the other hand, when it is determined that the processing for the N pixels has been terminated at the step S2004, N is set to 1 (a step S2005).

Additionally, a peripheral similarity $Sv1(k,l)$ is calculated based on the color difference (X−Gv)k,l which has been stored in the memory in a processing loop from the step S2001 to the step S2004 and calculated in the same interpolation type as the G signal missing position (k,l) and neighboring similar color differences in eight directions $(X-Gv)_{k+n,l+m}$ (where n: −2, 0, 2 and m: −2, 0, 2).

On the other hand, a peripheral similarity $Sv2(k,l)$ is calculated based on peripheral dissimilar color differences $(X-Gv)_{k+n,l+m}$ of the color difference (X−Gv)k,l (where n: −1, 1 and m: −1, 1).

These two peripheral similarities $Sv1(k,l)$ and $Sv2(k,l)$ are added to calculate a peripheral similarity Sv(k,l) (a step S2007).

Subsequently, likewise, a peripheral similarity $Sh1(k,l)$ is calculated based on the color difference (X−Gh)k,l which has been stored in the memory and calculated in the same interpolation type as the G signal missing position (k,l) and neighboring similar color differences in eight directions $(X-Gh)_{k+n,l+m}$ (where n: −2, 0, 2 and m: −2, 0, 2).

On the otter hand, a peripheral similarity Sh2(k,l) is calculated based on peripheral dissimilar color differences (X–Gh)$_{k+n,l+m}$ of the color difference (X–Gh)k,l (where n: –1, 1 and m; –1, 1).

These two peripheral similarities Sh1(k,l) and Sh2(k,l) are added to calculate a peripheral similarity Sh(k,l) (a step S2008).

Likewise, a peripheral similarity Sa1(k,l) is calculated based a color difference (XL–Ga)k,l which has been stored in the memory and calculated in the same interpolation type as the G signal missing position (k,l) and neighboring similar color differences (XL–Ga)$_{k+n,l+m}$ in eight directions (where n: –2, 0, 2 and m: –2, 0, 2).

On the other hand, a peripheral similarity Sa2(k,l) is calculated based on peripheral dissimilar color differences (XL–Ga)$_{k+n,l+m}$ of the color difference (XL–Ga)k,l (where n: –1, 1 and m: –1, 1).

These two peripheral similarities Sa1(k,l) and Sa2(k,l) are added to calculate a peripheral similarity Sa(k,l) (a step S2009).

Here, each of the peripheral similarities Sv(k,l), Sh(k,l) and Sa(k,l) is an amount having a similarity that increases as a value is reduced, and it is used for selecting one color different that has the largest similarity, i.e., that becomes minimum as a value of similarity.

That is, the peripheral similarities Sv(k,l) and Sh(k,l) are compared with each other when the three peripheral similarities Sv(k,l), Sh(k,l) and Sa(k,l) are calculated (a step S2010).

Here, when Sv(k,l) is smaller, Sv(k,l) is compared with Sa(k,l) (a step S2012).

When it is determined that Sv(k,l) is smaller as a result of the judgment, the control advances to a step 2013. Further, when it is determined that Sv(k,l) is larger or Sv(k,l) is equal to Sa(k,l) at the step S2012, the control advances to a step 2014.

Moreover, when it is determined that Sv(k,l) is larger or Sv(k,l) is equal to Sh(k,l) in the comparison between the peripheral similarities Sv(k,l) and Sh(k,l) at the step S2010, then Sh(k,l) is compared with Sa(k,l) (a step S2011).

Here, the control advances to a step S2015 when it is determined that Sh(k,l) is smaller, or the control advances to a step S2014 when it is determined that Sh(k,l) is larger or Sh(k,l) is equal to Sa(k,l).

At the step S2013, the color difference (k,l) at the G signal missing position (k,l) is determined as (X–Gv)k,l to be stored in the memory.

At the step S2014, the color difference (k,l) at the G signal missing position (k,l) is determined as (XL–Ga)k,l to be stored in the memory.

At the step S2015, the color difference (k,l) at the G signal missing position (k,l) is determined as (X–Gh)k,l to be stored in the memory.

After the memory storage processing at any one of the steps S2013 to S2015, G(k,l) is calculated by subtracting the color difference (k,l) determined at the G signal missing position (k,l) from X(k,l) to be stored in the memory (a step S2016).

Thereafter, high-color difference region processing (a step S2017) is further executed, but it will be described later based on a flowchart of a sub-routine in FIG. 12.

After the high-color difference region processing, whether the processing for a total number of pixels as output pixels has been terminated is judged (a step S2018). When it is determined that the processing for the total number of pixels has not been terminated, the control returns to the processing from the step S2001, and the above-described series of processing is continued while substituting unnecessary (X–Gv), (X–Gh), (XL–Ga), Sv, Sh and Sa stored in the memory with newly calculated values.

Figure 11:
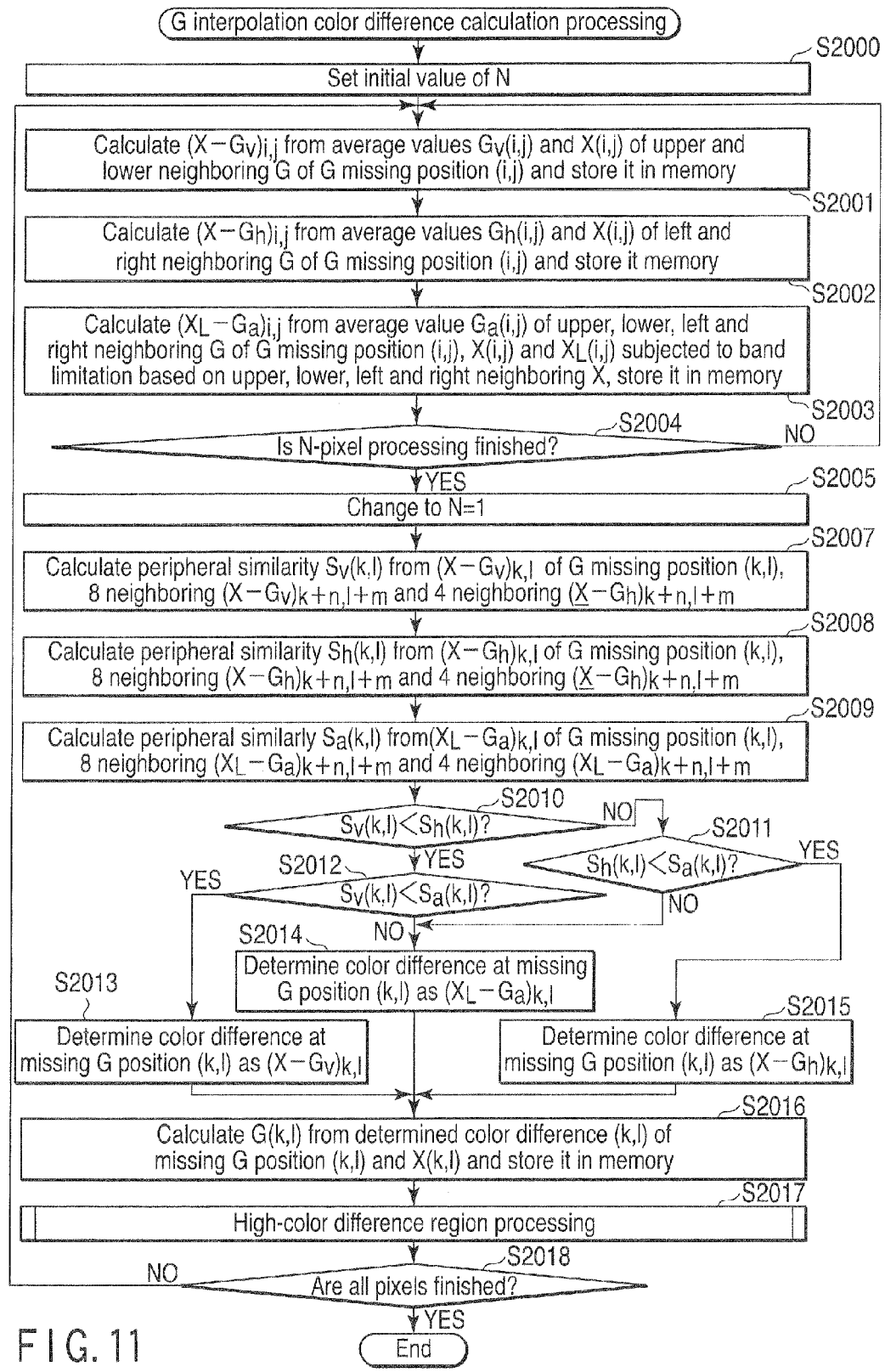
FIG. 11 is a flowchart showing a main routine of G interpolation color difference calculation processing according to the embodiment.

Thus, when the processing for the total number of pixels is all terminated, the state is judged at the step S2018, and the G interpolation color difference calculation processing in FIG. 11 is terminated.

Detailed processing contents of the high-color difference region processing will now be described with reference to FIG. 12.

FIG. 12 is a view showing a flowchart of a sub-routine of the high-color difference region processing. First, an average value Ga of peripheral four pixels G(k–1,l) G(k+1,l), G(k,l–1) and G(k,l+1) of the G signal missing position (k,l) is calculated (a step S3000).

Based on this calculation result, whether the color difference (k,l) determined at the G signal missing position (k, l) is (XL–Ga)k,l and its value is larger than a threshold value THc is judged (a step S3001).

Here, when it is determined that the color difference (k,l) is (XL–Ga)k,l and its value is larger than the threshold value THc, average values Gmm, Gmp, Gpm and Gpp of upper, lower, left and right adjacent G at oblique four positions of the G signal missing position are calculated (a step S3002).

At this time, a 45-degree direction average value s45 and a 135-degree direction average s135 are calculated from G (k,l) calculated at the immediate preceding step S2016 and Gmm, Gmp, Gpm and Gpp calculated at the step S3002 (a step S003).

The 45-degree direction average s45 and the 135-degree direction average value s135 calculated at this step S3003 are utilized to judge whether the flatness is provided (a step S3004).

Here, it is determined that the flatness is provided, G(k,l) is substituted by a peripheral four-pixel average value Ga (a step S3005).

On the other hand, when it is determined that the flatness is not provided at the step S3004, the 45-degree direction average value s45, the 135-degree direction average value s135 and G(k,l) calculated at the immediately preceding step S2016 are utilized to judge an edge direction (a step S3006).

Here, when it is determined that the edge direction corresponds to 45 degrees, the signal G(k,l) is substituted by the 45-degree direction average value s45 (a step S3008).

On the other hand, when it, is determined that the edge direction does not correspond to 45 degrees at the step S3006, G(k,l) is substituted by the 135-degree direction average value s135 (a step S3007).

This sub-routine depicted in FIG. 12 is terminated by executing the processing at any one of the steps S3005, S3007 and S3008, and the control returns to the main routine depicted in FIG. 11.

As described above, according to this embodiment, even if a color imaging signal in which a phenomenon such as frequency chasing has already occurred at the time of input is processed, since the input signal is not smoothed in all directions in a region having an edge in any direction other than respective horizontal and vertical directions, a color image that does not produce an adverse effect such as jaggy or artifacts at the edge can be restored.

It is to be noted that, in the embodiment, the G interpolation color difference calculation unit 102 can make a more accurate edge judgment since the edge judgment unit 221 judges a degree of flatness from a difference between a plurality of pixel interpolation values smoothed in oblique directions based on outputs from the oblique 45-degree G calculation unit 225 and the oblique 135-degree G calculation unit 226.

Further, in this embodiment, the G interpolation color difference calculation unit 102 can make a more appropriate edge judgment since the edge judgment unit 221 judges the edge direction as depicted in FIG. 12 based on a comparison result obtained by comparing a plurality of pixel interpolation values smoothed in oblique directions based on outputs from the oblique 45-degree G calculation unit 225 and the oblique 135-degree G calculation unit 226 with a difference between the color imaging signal and a pixel interpolation value calculated in the high-color difference judgment unit 219.

Furthermore, in the embodiment, since the interpolation processing unit 103 can assuredly remove an inconvenience such as jaggy or artifacts at an edge from a color image since the interpolation calculation unit 307 selects any one of pixel interpolation values smoothed in a plurality of oblique directions used for the judgment in the edge judgment unit 221 and utilizes it for a final result.

It is to be noted that the foregoing embodiment uses the color difference similarities to judge an edge direction, i.e., the horizontal direction/vertical direction/any other direction. However, for example, differences of G pixels aligned in the horizontal and vertical directions are calculated and compared, the edge can be determined as an edge in the vertical direction when a vertical difference is larger than a horizontal difference, the edge can be determined as an edge in the horizontal direction when the horizontal difference is larger than the vertical difference, and the edge can be determined as an edge in a direction other than the horizontal and vertical directions when a difference between a vertical average value and a horizontal average value is small. Further, an index utilized for this judging criterion is not restricted to the color difference similarity.

Figure 13A:
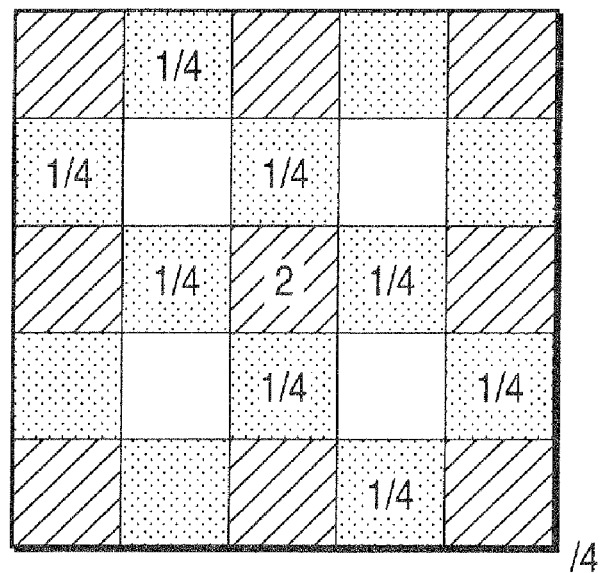
FIG. 13A is a view showing another calculation method of a 45-degree direction average value and a 135-degree direction average value according to the embodiment.
Figure 13B:
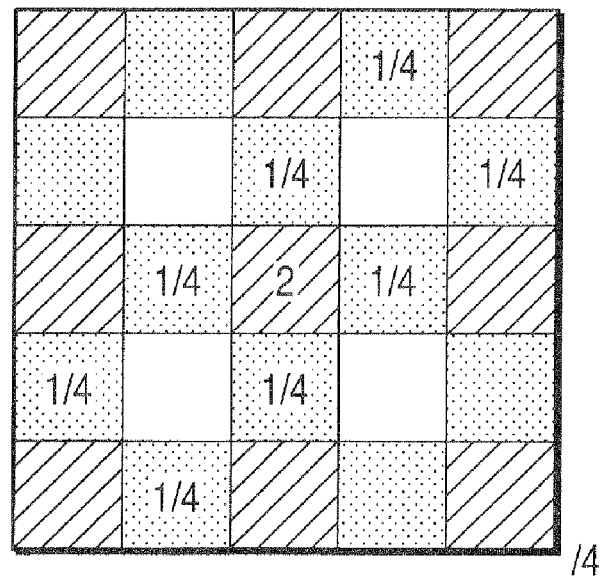
FIG. 13B is a view showing still another calculation method of a 45-degree direction average value and a 135-degree direction average value according to the embodiment.
Figure 14:
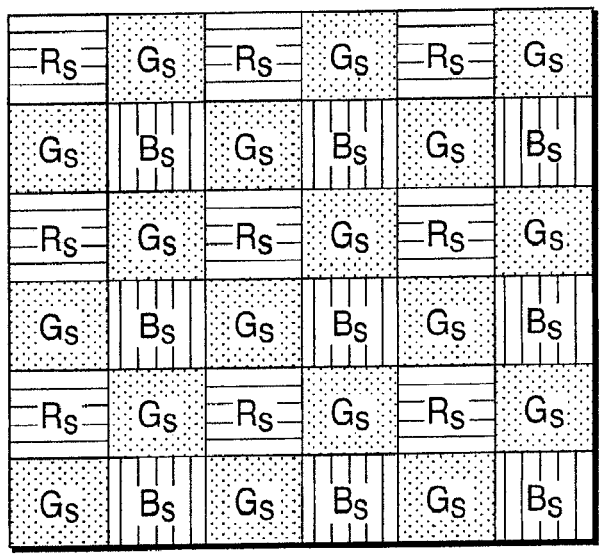
FIG. 14 is a view showing the Bayer arrangement of color filters for use in a general color imaging device.

Moreover, the foregoing embodiment has described that Gmm, Gmp, Gpm and Gpp at oblique four positions of the missing P position (k,l) are calculated in order to calculate the 15-degree direction average value s15 and the 135-degree direction average s135. However, it is needless to say that the completely the same result can be obtained when results obtained by attaching weight to such a central position as depicted in FIG. 13A or FIG. 13B and effecting filtering processing to halve a pixel value in each oblique direction are calculated as the 45-degree direction average value s45 and the 135-degree direction average value s135 without adopting these calculation methods.

The present invention provides an image processing apparatus, an image processing method and a program that suppress occurrence of an adverse effect such as jaggy or artifacts even though a color imaging signal including a phenomenon such as frequency aliasing at the time of input is processed when interpolating a missing color signal with respect to the color imaging signal acquired by a single-chip imaging element.

Besides, the present invention is not restricted to the foregoing embodiment, and it can be modified in many ways without departing from its scope on the embodying stage. Further, the functions executed in the foregoing embodiment may be appropriately combined and carried out if at all possible. The foregoing embodiment includes various stages, and various inventions can be extracted by appropriately combining a plurality of disclosed constituent requirements. For example, if the effect can be obtained even though some of all constituent requirements disclosed in the embodiment are deleted, a configuration from which these constituent elements are deleted can be extracted as an invention.

What is claimed is:

1. An image processing apparatus comprising:
   an imaging device in which a plurality of types of imaging elements having different spectral sensitivities are aligned on a single plane and which obtains a color imaging signal;
   a first edge direction judging unit which judges a direction along which an edge is produced in the color imaging signal based on pixel values of the respective imaging elements;
   a high-color difference region judging unit which judges a region where the pixel values have a high-color difference equal to or above a predetermined value when the first edge direction judging unit determines that the direction of the edge is other than a specific direction;
   a second edge direction judging unit which further judges a direction of the edge when the high-color difference judging unit determines the region where the pixel values have the high-color difference;
   a direction dependence smoothing unit which smooths the pixel values of the respective imaging elements by interpolating the pixel values along the direction determined by the second edge direction judging unit; and
   an omnidirectional smoothing unit which smooths the pixel values of the respective imaging elements in all directions based on pixel values of peripheral pixels when the second edge direction judging unit determines that there is no edge in all directions.

2. The apparatus according to claim 1, wherein the second edge direction judging unit determines that there is no edge in all directions by judging flatness from a difference between a plurality of pixel interpolation values used for the smoothing in directions different from the specific direction.

3. The apparatus according to claim 1, wherein the second edge direction judging unit judges the direction of the edge based on a comparison result obtained by comparing a plurality of pixel interpolation values used for smoothing in directions different from the specific direction with differences between the color imaging signal and the pixel interpolation values calculated from the high-color difference.

4. The apparatus according to claim 1, wherein the direction dependence smoothing unit includes an interpolation value selecting unit which selects any one of pixel interpolation values which are used for the judgment by the second edge direction judging unit and used for smoothing in a plurality of directions different from the specific direction and uses the selected value as a final result.

5. An image processing method comprising:
   judging a direction along which an edge is produced in a color imaging signal based on pixel values of a plurality of types of imaging elements from an imaging device in which the respective imaging elements having different spectral sensitivities are aligned on a single plane and which obtains the color imaging signal;
   judging a region where the pixel values have a high-color difference equal to or above a predetermined value when it is determined that the direction of the edge is other than a specific direction;
   further judging a direction of the edge when the region where the pixel values have the high-color difference is determined;
   smoothing the pixel values of the respective imaging elements by interpolating the pixel values along the direction determined by the further judging; and
   smoothing the pixel values of the respective imaging elements in all directions based on pixel values of peripheral pixels when it is determined that there is no edge in all directions by the further judging.

6. A non-transitory computer-readable recording medium having a program stored thereon that is executable by a computer in an apparatus including an imaging device in which a plurality of types of imaging elements having different spectral sensitivities are aligned on a single plane and which obtains a color imaging signal, the program allowing the computer to perform functions comprising:

judging a direction along which an edge is produced in the color imaging signal based on pixel values of the respective imaging elements;

judging a region where the pixel values have a high-color difference equal to or above a predetermined value when it is determined that the direction of the edge is other than a specific direction further judging a direction of the edge when the region where the pixel values have the high-color difference is determined;

smoothing the pixel values of the respective imaging elements by interpolating the pixel values along the direction determined by the further judging; and smoothing the pixel values of the respective imaging elements in all directions based on pixel values of peripheral pixels when it is determined that there is no edge in all directions by the further judging.

\* \* \* \* \*